United States Patent
Kawazoe

(10) Patent No.: US 11,371,551 B2
(45) Date of Patent: Jun. 28, 2022

(54) MANUFACTURING METHOD FOR CONNECTING ROD

(71) Applicant: TOYOTA JIDOSHA KABUSHIKI KAISHA, Toyota (JP)

(72) Inventor: Takaaki Kawazoe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 426 days.

(21) Appl. No.: 16/253,959

(22) Filed: Jan. 22, 2019

(65) Prior Publication Data

US 2019/0234455 A1 Aug. 1, 2019

(30) Foreign Application Priority Data

Feb. 1, 2018 (JP) .............................. JP2018-016197

(51) Int. Cl.
*F16C 9/04* (2006.01)
*B21K 1/76* (2006.01)
*F16C 7/02* (2006.01)

(52) U.S. Cl.
CPC .............. *F16C 9/045* (2013.01); *B21K 1/766* (2013.01); *F16C 7/023* (2013.01); *F16C 2360/22* (2013.01)

(58) Field of Classification Search
CPC ...... F16C 9/045; F16C 7/023; F16C 2360/22; B21K 1/766; B23P 2700/04
See application file for complete search history.

(56) References Cited

U.S. PATENT DOCUMENTS 8,657,171 B2 * 2/2014 Yamada ................. F16C 9/045
225/103
2011/0219613 A1 9/2011 Yamada et al.

FOREIGN PATENT DOCUMENTS

| JP | 2011-183529 A | 9/2011 | |
| JP | 2014094434 A * | 5/2014 | ............. F16C 9/045 |
| JP | 2016-089977 A | 5/2016 | |
| JP | 2017-087314 A | 5/2017 | |

OTHER PUBLICATIONS

Machine Translation of JP2014094434A, Kaiho Ryuji et al. "Rupture Dividing method and device of connecting rod". May 22, 2014.*

* cited by examiner

*Primary Examiner* — Nirvana Deonauth
(74) *Attorney, Agent, or Firm* — Oliff PLC

(57) ABSTRACT

A manufacturing method for a connecting rod includes applying a tensile load to an end portion of the connecting rod as precompression in a cross direction that intersects with a longitudinal direction, the end portion being an longitudinal end portion of the connecting rod and having a through-hole, and fracture splitting the end portion into a rod portion and a cap portion by applying a tensile load to the end portion in the longitudinal direction in a state where the precompression is applied to the end portion.

4 Claims, 10 Drawing Sheets

MANUFACTURING METHOD FOR CONNECTING ROD

INCORPORATION BY REFERENCE

The disclosure of Japanese Patent Application No. 2018-016197 filed on Feb. 1, 2018 including the specification, drawings and abstract is incorporated herein by reference in its entirety.

BACKGROUND

1. Technical Field

The disclosure relates to a manufacturing method for a connecting rod.

2. Description of Related Art

There is known a method for fracture splitting a connecting rod into a rod portion and a cap portion by expanding a through-hole of the connecting rod in a longitudinal direction, the through-hole being formed in an end portion of the connecting rod in the longitudinal direction (for example, Japanese Unexamined Patent Application Publication No. 2016-089977 (JP 2016-089977 A)).

SUMMARY

The rod portion and the cap portion after the fracture are assembled by superimposing fracture surfaces on each other. When the fracture between the rod portion and the cap portion is performed by ductile fracture with plastic deformation, surface properties of the fracture surfaces are degraded. When the surface properties of the fracture surfaces are degraded as described above, there is a possibility that alignment accuracy of the rod portion and the cap portion is reduced.

Therefore, the disclosure provides a manufacturing method for a connecting rod in which surface properties of fracture surfaces are ensured by performing brittle fracture between a rod portion and a cap portion.

A manufacturing method for a connecting rod according to a first aspect of the disclosure includes applying a tensile load to an end portion of the connecting rod as precompression in a cross direction that intersects with a longitudinal direction, the end portion being a longitudinal end portion of the connecting rod and having a through-hole, and fracture splitting the end portion into a rod portion of the connecting rod and a cap portion of the connecting rod by applying a tensile load to the end portion in the longitudinal direction in a state where the precompression is applied to the end portion.

Applying a tensile load to the end portion of the connecting rod as precompression in the cross direction that intersects with the longitudinal direction of the connecting rod results in a state where a compressive load along the longitudinal direction of the connecting rod acts on the end portion. When the end portion is fractured due to the tensile load applied to the end portion in the longitudinal direction in the state where the compressive load is acting on the end portion along the longitudinal direction caused by the pre-compression, then slip deformation is restrained at the time of the fracture. Thus, brittle fracture is ensured, thereby ensuring surface properties of fracture surfaces of the rod portion and the cap portion.

The end portion may include first and second bolt holes that are separated from each other with the through-hole interposed between the first and second bolt holes and extend in the longitudinal direction. When the precompression is applied to the end portion, first and second insertion members inserted into the first and second bolt holes, respectively, may be used to apply the tensile load in the cross direction.

When the precompression is applied to the end portion, the first and second insertion members and third and fourth insertion members may be used to apply the tensile load to the end portion in the cross direction. The first and second insertion members are inserted into the first and second bolt holes, respectively, from a first side, and the third and fourth insertion members are inserted into the first and second bolt holes, respectively, from a second side.

The cross direction may be perpendicular to an axis direction of the through-hole.

The cross direction may be along the axis direction of the through-hole.

The first and second insertion members may be bar-shaped members extending in axis directions of the first and second bolt holes.

According to the disclosure, provided is the manufacturing method for the connecting rod in which the surface properties of the fracture surfaces are ensured by performing brittle fracture between the rod portion and the cap portion.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
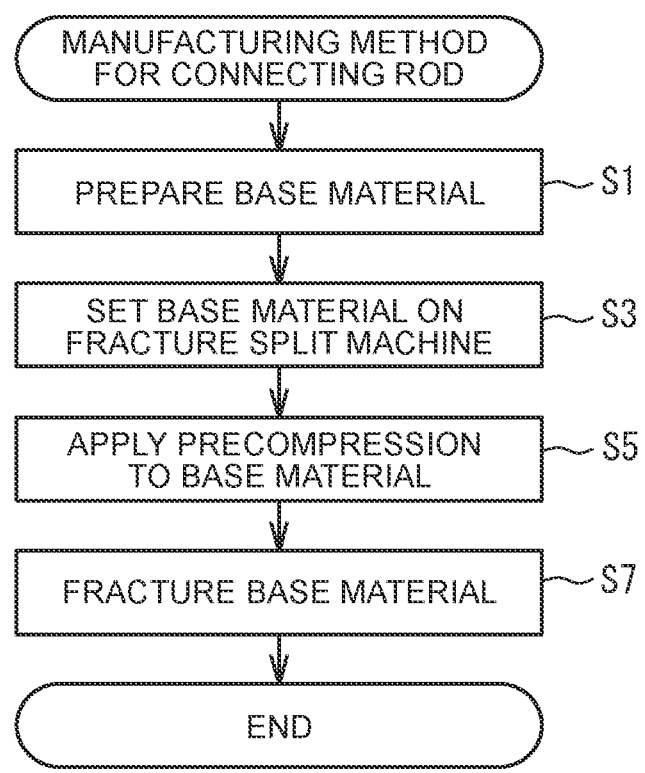
FIG. 1 is a flowchart showing processes of a manufacturing method of a connecting rod.
Figure 2A:
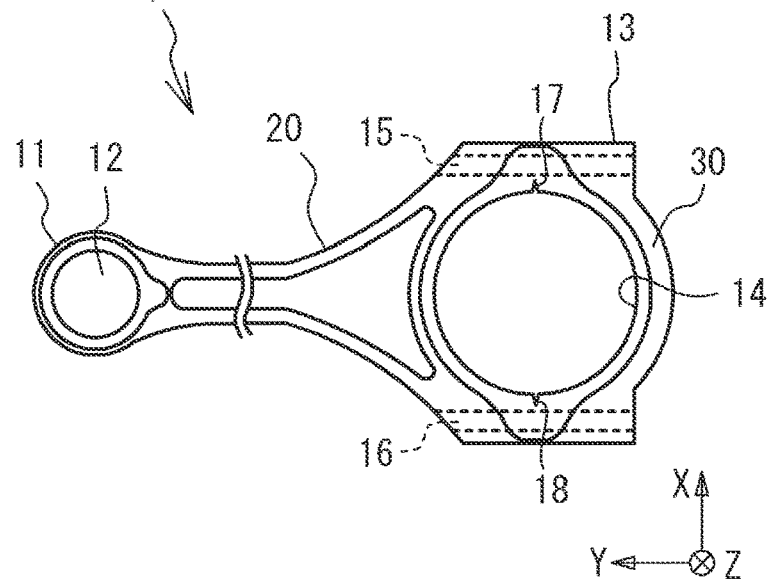
FIG. 2A is a view describing a base material.

FIG. 1 is a flowchart showing processes of a manufacturing method for a connecting rod. First of all, a base material 1 for the connecting rod is prepared (step S1). FIG. 2A is a view describing the base material 1. The connecting rod is used for an internal combustion engine. The base material 1 is a steel material formed by casting or forging. FIG. 2A shows an X direction, a Y direction, and a Z direction that are orthogonal to one another. The Y direction and the X direction correspond to a longitudinal direction and a short direction of the base material 1, respectively. The Z direction corresponds to a thickness direction of the base material 1. The X direction includes a +X direction and a −X direction that are opposite directions to each other, and is referred to as the X direction unless superficially limited in the specification. When the X direction is limited to the X direction indicated by an arrow in the drawings, the X direction is referred to as the +X direction. When the X direction is limited to an opposite direction of the +X direction, the X direction is referred to as the −X direction. This also applies to the Y direction and the Z direction.

In the base material 1, a small end hole 12 is formed in a small end portion 11 on a first end side in the Y direction, and a large end hole 14 is formed in a large end portion 13 on a second end side in the Y direction. Both of the small end hole 12 and the large end hole 14 are formed so as to pass through the base material 1 in the Z direction that is a thickness direction of the base material 1. This means that axis directions of the small end hole 12 and the large end hole 14 are the Z direction. In the completed connecting rod, a piston pin and a crank pin are inserted in the small end hole 12 and the large end hole 14, respectively, and are assembled to the internal combustion engine. The large end hole 14 is formed so as to have a larger inner diameter than that of the small end hole 12. The large end hole 14 is an example of a through-hole that is formed in the large end portion 13 of the base material 1. The large end portion 13 is an end portion of the base material 1 in the Y direction.

The base material 1 includes a rod portion 20 and a cap portion 30. The cap portion 30 continues from the rod portion 20 in a −Y direction. In the rod portion 20, the small end portion 11 and the small end hole 12, as well as a semicircular portion of the large end hole 14 are formed. In the cap portion 30, the remaining semicircular portion of the large end hole 14 is formed. The rod portion 20 and the cap portion 30 are made by fracture split that starts from grooves 17, 18 that are formed on an inner peripheral surface of the large end hole 14. This will be described in detail later. A given jig is inserted in the large end hole 14 and applies a tensile load to the large end hole 14 so that the rod portion 20 and the cap portion 30 are separated from one another in a +Y direction and the −Y direction, respectively. Thus, the fracture split of the large end hole 14 happens, starting from the grooves 17, 18. This will be described in detail later.

Figure 2B:
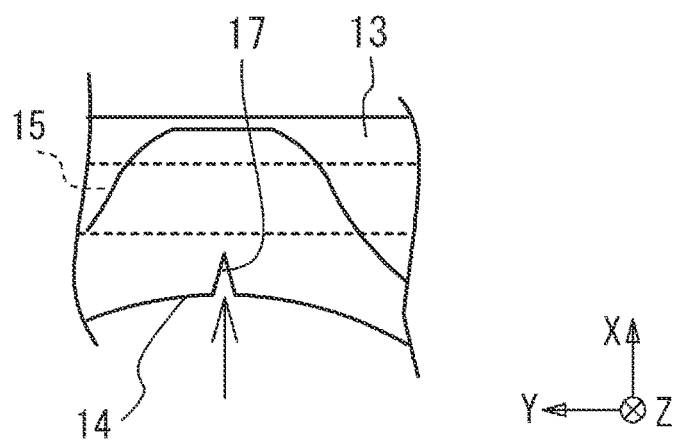
FIG. 2B is a partially enlarged view of FIG. 2A.
Figure 2C:
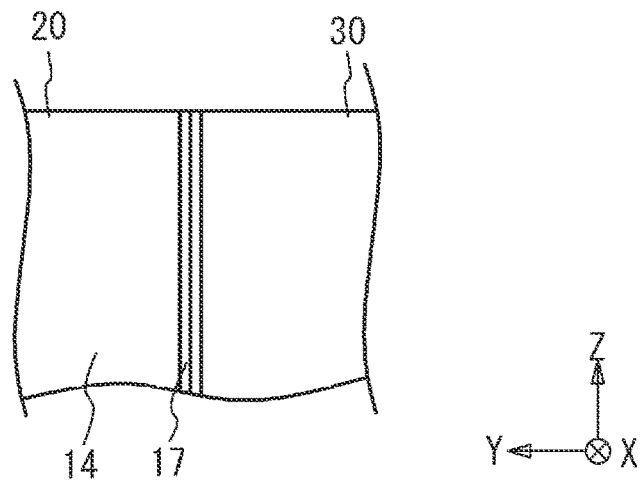
FIG. 2C is a view seen along the arrow in FIG. 2B.

Bolt holes 15, 16 are formed in the rod portion 20 and the cap portion 30. In the bolt holes 15, 16, bolts for connecting the rod portion 20 and the cap portion 30 with each other after the fracture split are inserted, respectively. The bolt holes 15, 16 are separated from each other through the large end hole 14 in the X direction, and extend in the Y direction. Specifically, the position of the bolt hole 16 is in the −X direction with respect to the bolt hole 15. The bolt holes 15, 16 are examples of first and second bolt holes that are separated from each other through the large end hole 14 and extend in the Y direction FIG. 2B is a partially enlarged view of FIG. 2A, and FIG. 2C is a view shown along the arrow in FIG. 2B. The grooves 17, 18 are formed at positions, respectively, the positions being separated from each other in the X direction through the large end hole 14. Both of the grooves 17, 18 have a groove shape extending in the Z direction. As shown in FIG. 2B, the groove 17 has a V shape in a view from the Z direction. The groove 17 extends in the Z direction that is the thickness direction of the base material 1, and also the axis direction of the large end hole 14. The same applies to the groove 18. The grooves 17, 18 are formed in the base material 1 in advance by using, for example, a laser beam machining.

Figure 3A:
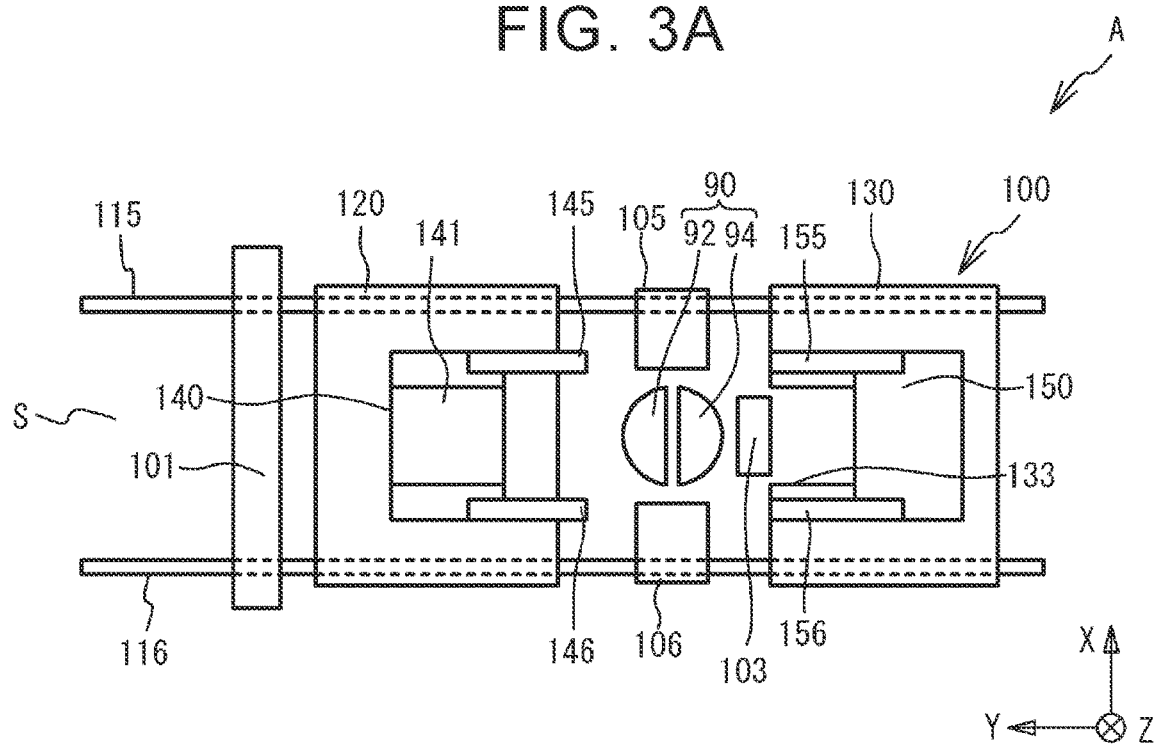
FIG. 3A is a view describing a fracture split machine.
Figure 3B:
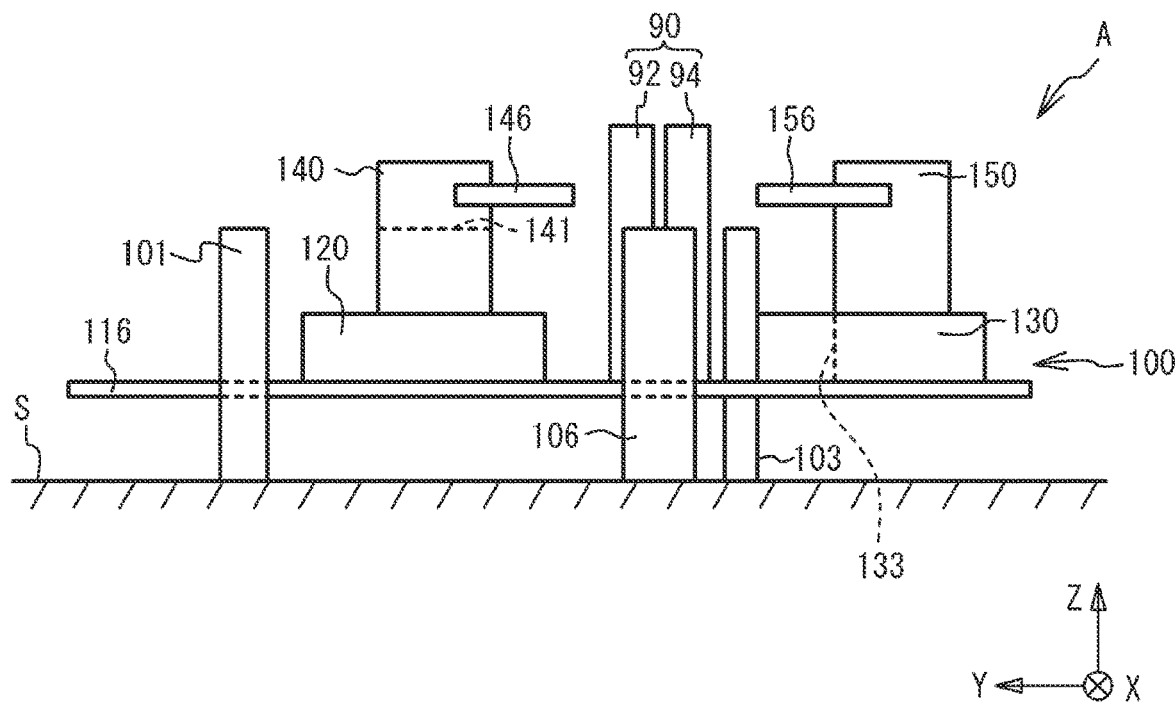
FIG. 3B is a view describing the fracture split machine.
Figure 4A:
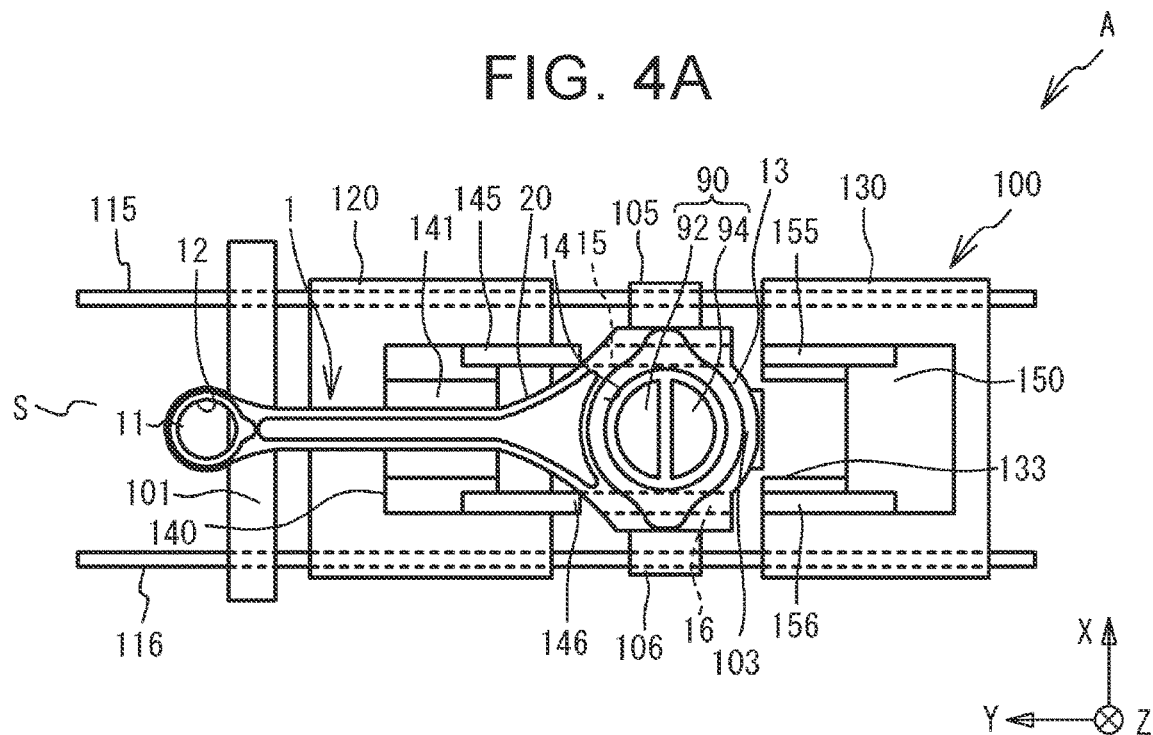
FIG. 4A is a view describing a process in which the base material is set on the fracture split machine.
Figure 4B:
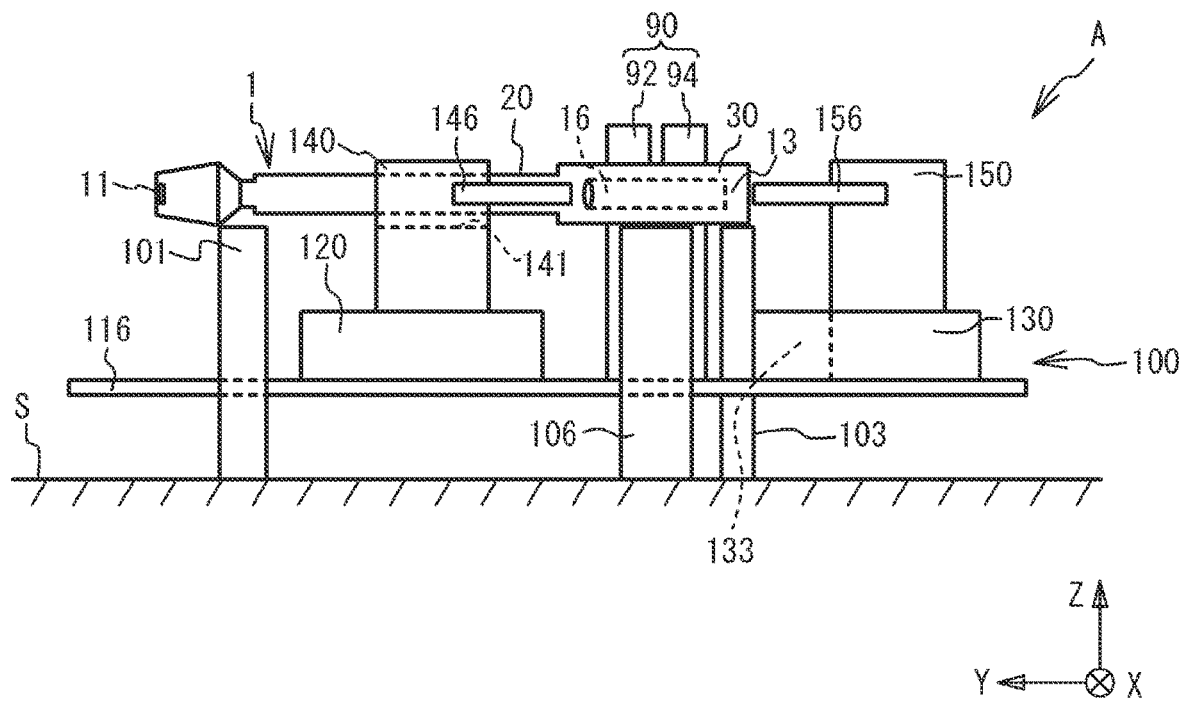
FIG. 4B is a view describing the process in which the base material is set on the fracture split machine.

Next, the base material 1 is set on a fracture split machine A (step S3). FIG. 3A and FIG. 3B are views describing the fracture split machine A. FIG. 3A shows the fracture split machine A seen in the Z direction. FIG. 3B shows the fracture split machine A seen in the X direction. FIG. 4A and FIG. 4B are views describing processes of setting the base material 1 on the fracture split machine A. FIG. 4A and FIG. 4B correspond to FIG. 3A and FIG. 3B, respectively. In the base material 1 shown in FIG. 4A and FIG. 4B, the grooves 17, 18 are not shown. The fracture split machine A includes a mandrel 90 and a precompression application mechanism 100. The mandrel 90 applies a tensile load in order to fracture split the base material 1. The precompression application mechanism 100 supports the base material 1 and also applies a tensile load to the base material 1 as precompression. In the drawings, the precompression application mechanism 100 placed on a support surface S is shown As shown in FIG. 3A, the precompression application mechanism 100 includes support members 101, 103, 105, 106. The support members 101, 103 are separated from each other in the Y direction, the support members 105, 106 are separated from each other in the X direction. As shown in FIG. 4A, the base material 1 is set on the support member 101 and so on so that the small end portion 11 and the large end portion 13 are supported by the support members 101, 103, respectively, and both side portions of the base material 1 across the large end hole 14 are supported by the support members 105, 106, respectively.

As shown in FIG. 3A, the mandrel 90 is inserted in space surrounded by the support members 103, 105, 106 from above the precompression application mechanism 100. The mandrel 90 includes mandrel halves 92, 94 that can be separated from each other in the Y direction. As shown in FIG. 4A, the mandrel halves 92, 94 are inserted into the large end hole 14 of the base material 1 that is set on the precompression application mechanism 100.

The precompression application mechanism 100 includes guide members 115, 116, movable stands 120, 130, and drive mechanisms 140, 150. The guide members 115, 116 are separated from each other in the X direction, and parallel to each other in the Y direction. The movable stands 120, 130 are supported by the guide members 115, 116 so that the movable stands 120, 130 are able to move in the Y direction. Both of the guide members 115, 116 pass through the support member 101, and the guide members 115, 116 pass through the support members 105, 106, respectively. The guide members 115, 116 are fixed so as not to move with respect to the support member 101, 105, 106. The movable stand 120 is supported between the support member 101 and the support members 105, 106 so that the movable stand 120 is able to move in the Y direction. The movable stand 130 is supported on an opposite side of the support members 105, 106 from the movable stand 120 so that the movable stand 130 is able to move in the Y direction.

The drive mechanisms 140, 150 are held on upper surfaces of the movable stands 120, 130, respectively. The drive mechanism 140 includes insertion members 145, 146. The insertion members 145, 146 are bar-shaped members that are separated from each other in the X direction and extend in parallel to each other in the Y direction. Sections of the insertion members 145, 146 perpendicular to the Y direction have a circular shape. The drive mechanism 140 incorporates an actuator, and a mechanism that transmits power of the actuator to the insertion members 145, 146. Due to the power of the actuator, the insertion members 145, 146 move closer to and are separated from each other in the X direction at given intervals. Similarly, the drive mechanism 150 includes insertion members 155, 156. The insertion members 155, 156 are bar-shaped members that are separated from each other in the X direction and extend in parallel to each other in the Y direction. Sections of the insertion members 155, 156 perpendicular to the Y direction have a circular shape. The drive mechanism 150 incorporates an actuator, and a mechanism that transmits power of the actuator to the insertion members 155, 156. Due to the power of the actuator, the insertion members 155, 156 move closer to and are separated from each other in the X direction at given intervals.

As shown in FIG. 3A, the insertion members 145, 155 are positioned coaxially with each other, and the insertion members 146, 156 are also positioned coaxially with each other. In a state shown in FIG. 3A, the interval between the insertion members 145, 146 in the X direction is set to be almost the same as an interval between the bolt holes 15, 16 of the base material 1 in the X direction. This is the same for the insertion members 155, 156. In this state, as shown in FIG. 4A, the base material 1 is set on the support member 101 and so on so that axes of the insertion members 145, 155 pass through the bolt hole 15 of the base material 1, and that axes of the insertion members 146, 156 pass through the bolt hole 16 of the base material 1. As shown in FIG. 4B, in an upper surface of the drive mechanism 140, a depressed portion 141 is formed in order to prevent interference with the base material 1 that is set on the support member 101 and so on. Also, in an edge of the movable stand 130 on a side of the support member 103, a depressed portion 133 is formed in order to prevent interference with the support member 103 when the movable stand 130 moves closer to the support member 103.

Figure 5A:
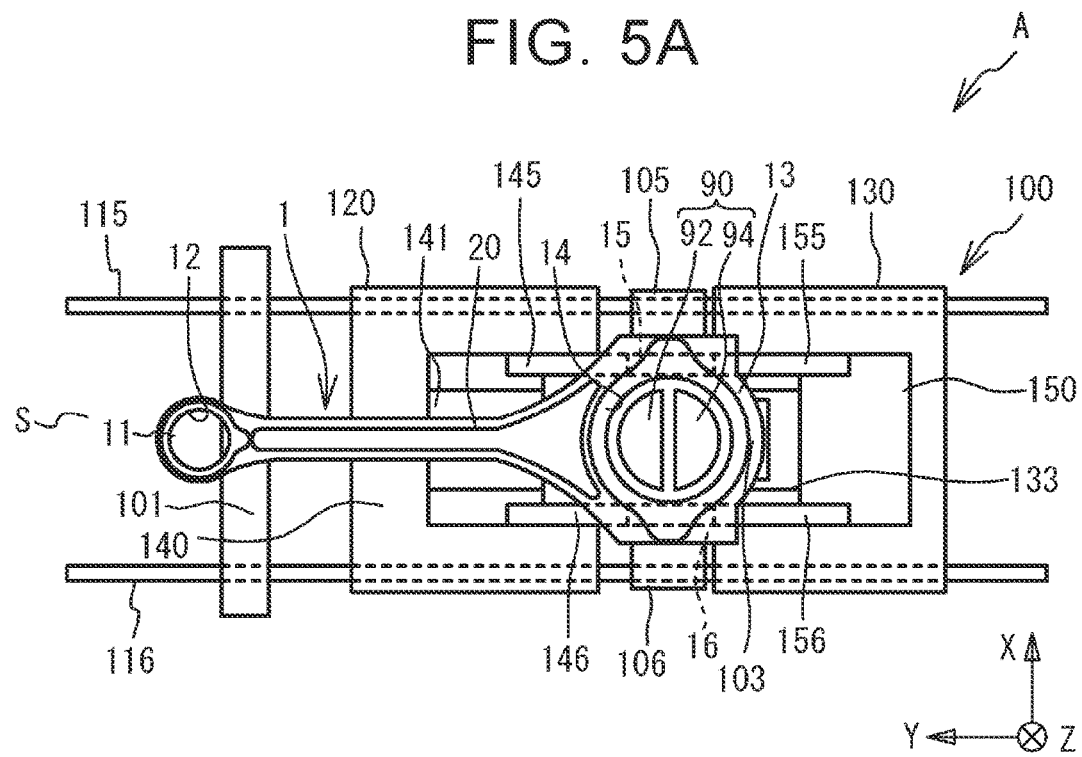
FIG. 5A is a view describing a process in which precompression is applied to the base material.
Figure 5B:
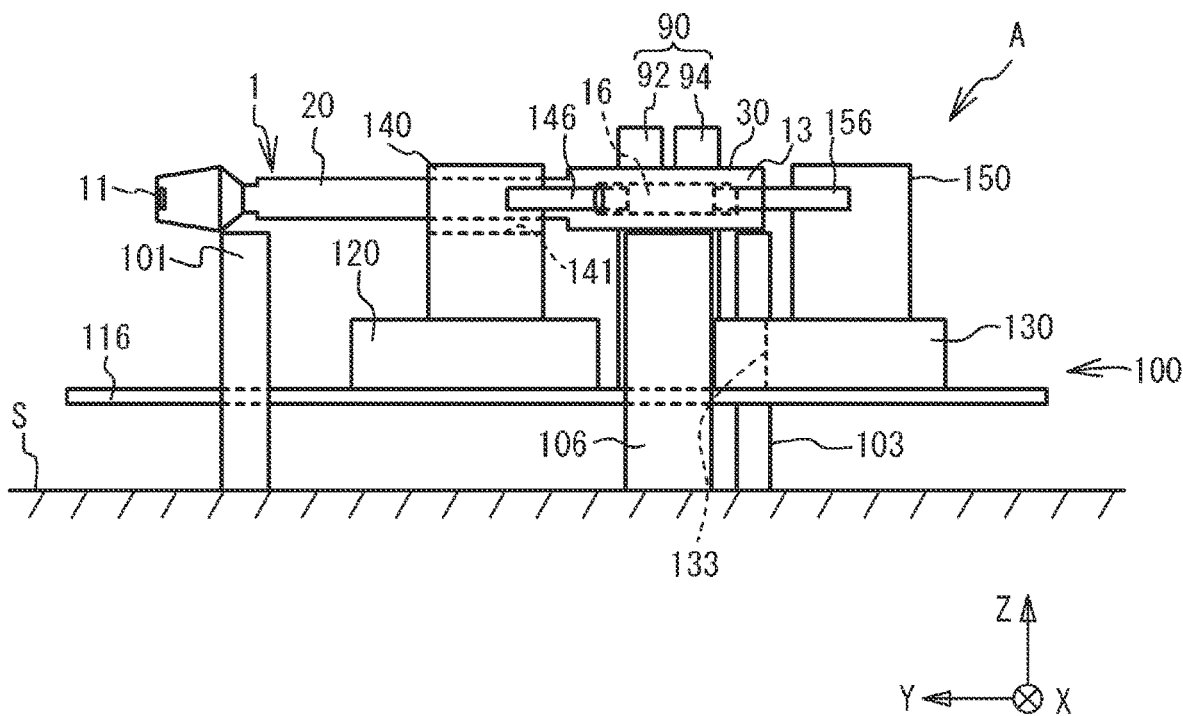
FIG. 5B is a view describing the process in which precompression is applied to the base material.

Next, precompression is applied to the base material 1 (step S5). FIG. 5A and FIG. 5B are views describing precompression to the base material 1. The guide members 115, 116 guide the movable stand 120 in the −Y direction, and also guide the movable stand 130 in the +Y direction. Then, the insertion members 145, 146 are inserted in the bolt holes 15, 16 of the base material 1, respectively, from a side of the small end portion 11, and the insertion members 155, 156 are inserted in the bolt holes 15, 16, respectively, from a side of the large end portion 13. The insertion members 145, 146 are an example of first and second insertion members that are inserted into the bolt holes 15, 16, respectively, from the small end portion 11 side, and the insertion members 155, 156 are an example of third and fourth insertion members that are inserted in the bolt holes 15, 16, respectively, from the large end portion 13 side.

The movable stands 120, 130 are stopped before distal ends of the insertion members 145, 155 come into contact with each other inside the bolt hole 15, and distal ends of the insertion members 146, 156 come into contact with each other inside the bolt hole 16. In this state, the insertion members 145, 146 press inner peripheral surfaces of the bolt holes 15, 16, respectively, in a way that the insertion members 145, 146 are separated from each other in the X direction. Similarly, the insertion members 155, 156 also press the inner peripheral surfaces of the bolt holes 15, 16, respectively, in a way that the insertion members 155, 156 are separated from each other in the X direction. Thus, as precompression, a tensile load is applied to the large end portion 13 of the base material 1 in the +X direction from a side of the bolt hole 15, and also in the −X direction from a side of the bolt hole 16. The process in step S5 is an example of a precompression process in which a tensile load is applied to the large end portion 13 as precompression in the X direction that is a cross direction that intersects with the longitudinal direction.

Figure 6:
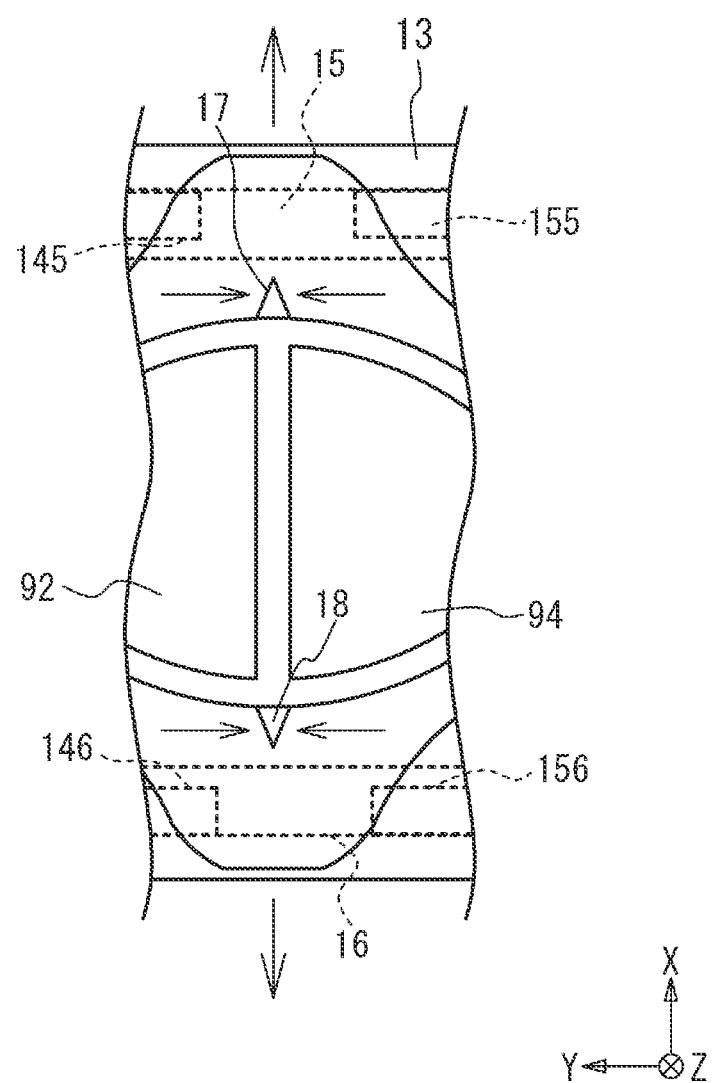
FIG. 6 is an enlarged view of a periphery of a groove when precompression is applied to a large end portion.

FIG. 6 is an enlarged view of the vicinity of the grooves 17, 18 when precompression is applied to the large end portion 13. As a tensile load in the X direction is applied to the large end portion 13 as precompression, a compressive load acts at least on the periphery of the large end hole 14 due to Poisson's effect so that the large end hole 14 is squeezed in the Y direction. In the state where the precompression is applied, the insertion members 145, 155 come into contact with the inner peripheral surface of the bolt hole 15 on a side away from the large end hole 14, and the insertion members 146, 156 come into contact with the inner peripheral surface of the bolt hole 16 on a side away from the large end hole 14. Thus, displacement of the base material 1 in the X direction and the Z direction is restrained.

Figure 7A:
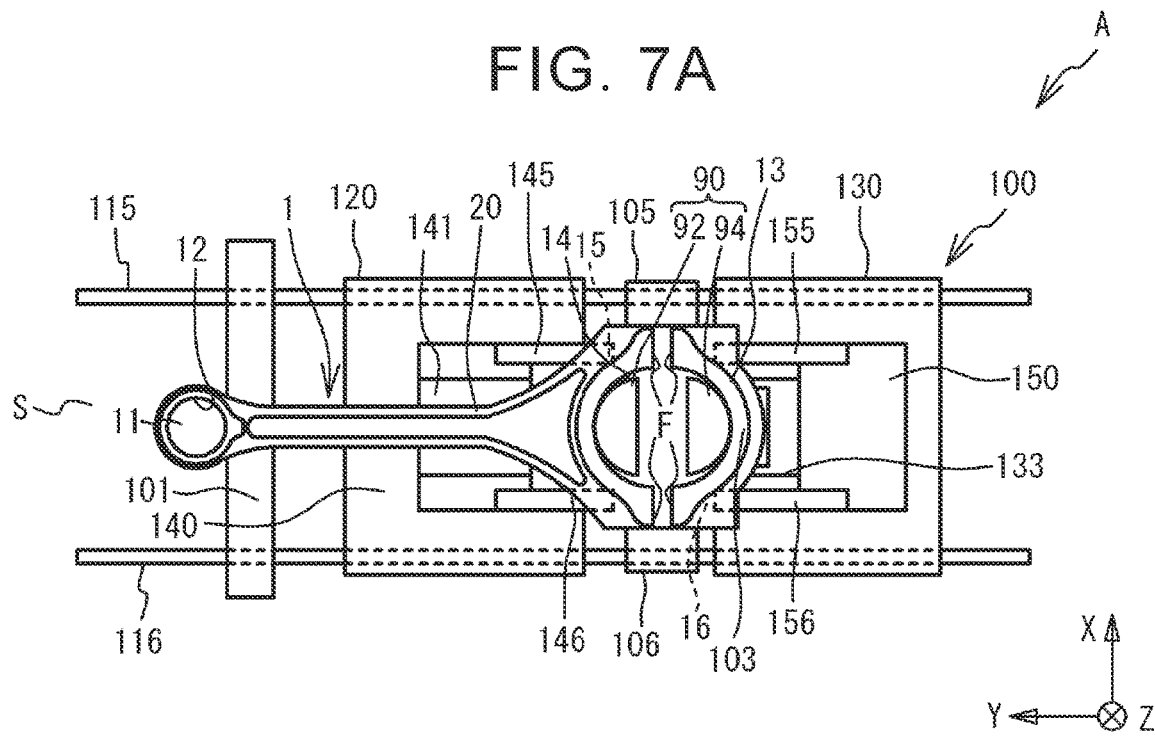
FIG. 7A is a view describing a process in which the base material is fractured.
Figure 7B:
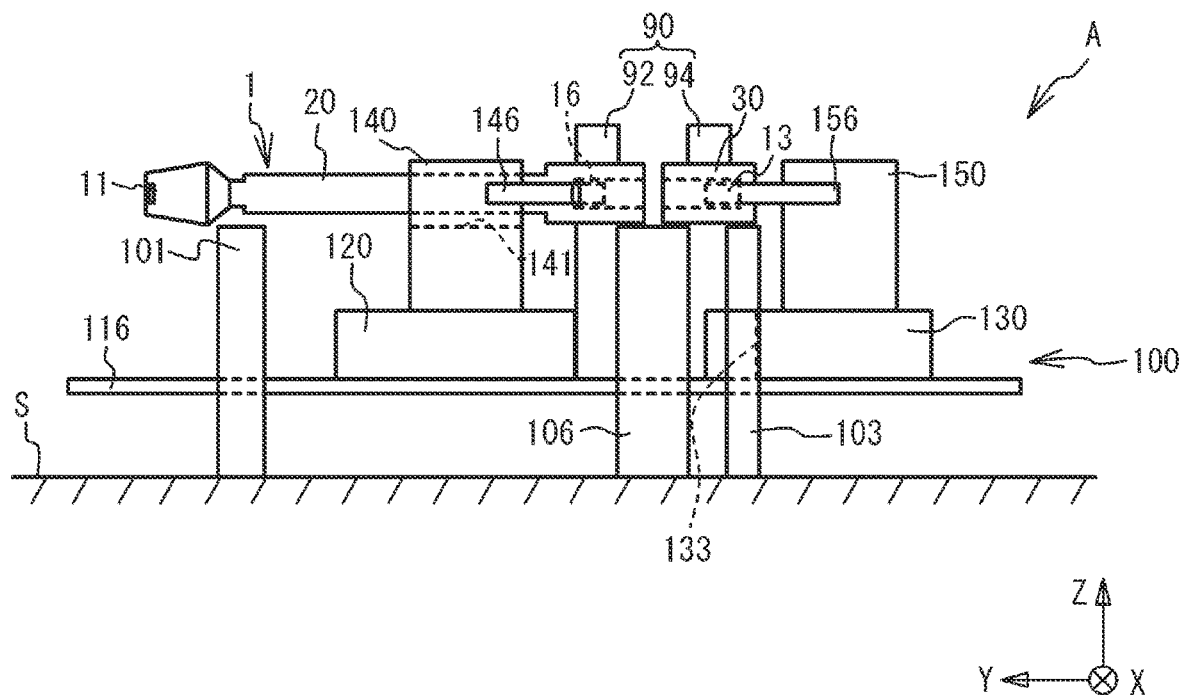
FIG. 7B a view describing the process in which the base material is fractured.

Next, in the state where the precompression is applied, the base material 1 is fractured (step S7). FIG. 7A and FIG. 7B are views describing a process of fracturing the base material 1. As shown in FIG. 7A and FIG. 7B, the mandrel half 92 moves in the +Y direction, and the mandrel half 94 moves in the −Y direction. Thus, the mandrel halves 92, 94 press the inner peripheral surface of the large end hole 14, and a tensile load in the Y direction is applied to the large end portion 13. Because of this, a crack advances in the +X direction staring from the groove 17, and a crack advances in the −X direction starting from the groove 18. Then, the large end portion 13 is fractured into the rod portion 20 and the cap portion 30. Although the details are described later, because the base material 1 is fractured in the state where the precompression is applied, brittle fracture is ensured, and surface properties of fracture surfaces F are thus ensured. Therefore, it is possible to ensure alignment accuracy of the fracture surfaces F. The process in the step S7 is an example of a fracture process in which the large end portion 13 is fracture split into the rod portion 20 and the cap portion 30 as a tensile load in the longitudinal direction is applied to the large end portion 13 in the state where the precompression is applied to the large end portion 13.

Also, at the time of the fracture, the inner peripheral surfaces of the bolt holes 15, 16 on a side of the rod portion 20 move in the +Y direction while the inner peripheral surfaces are in sliding contact with the insertion members 145, 146, respectively. Also, the inner peripheral surfaces of the bolt holes 15, 16 on a side of the cap portion 30 move in the −Y direction while the inner peripheral surfaces are in sliding contact with the insertion members 155, 156, respectively. This means that, while the fracture allows the rod portion 20 and the cap portion 30 to move in the Y direction, displacement of the rod portion 20 and the cap portion 30 in the X direction and the Z direction is restricted when the fracture is happening. This is because all of the insertion members 145, 146, 155, 156 and the bolt holes 15, 16 extend in the Y direction.

Figure 8A:
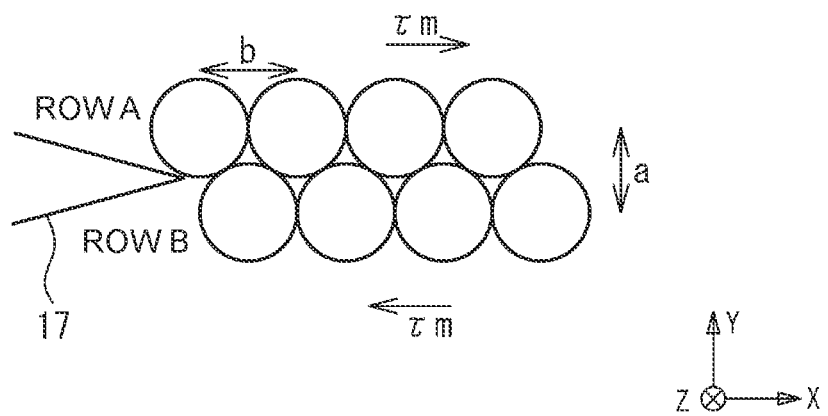
FIG. 8A is a view describing an atomic arrangement in the periphery of the groove of the base material.
Figure 8B:
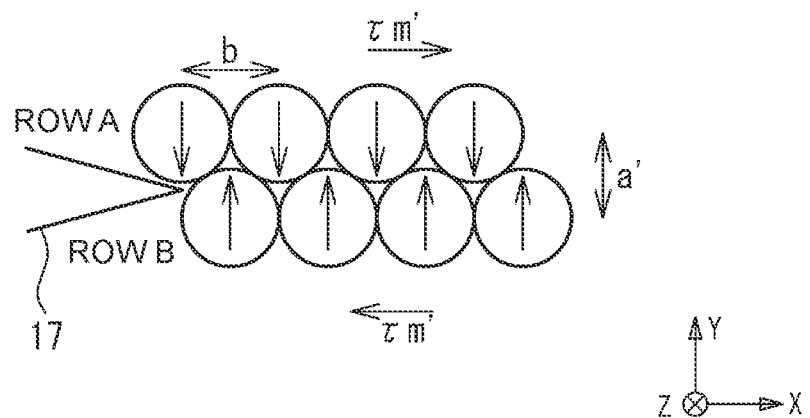
FIG. 8B is a view describing the atomic arrangement in the periphery of the groove of the base material.

Next, described is a mechanism for ensuring brittle fracture as the fracture is performed in the state where the precompression is applied. FIG. 8A and FIG. 8B are views describing an atomic arrangement in the periphery of the groove 17 of the base material 1. FIG. 8A and FIG. 8B show an atomic row A, an atomic row B, a slide surface distance a, and an interatomic distance b in a slide direction. The atomic row A and the atomic row B are arrayed in the X direction. The atomic row A and the atomic row B are positioned next to each other in the Y direction. Since the large end portion 13 is fractured by a tensile load in the Y direction, the slide direction at the time of the fracture is the X direction. Here, when shearing stress acting on the large end portion 13 in the X direction exceeds critical shearing stress τm, the base material 1 is fractured. The critical shearing stress τm is calculated by the following expression when rigidity of the base material 1 is G.

$$\tau m = G \cdot b/(2\pi a) \qquad (1)$$

The critical shearing stress in the state where the precompression described above is not applied is represented by τm, and the critical shearing stress when the precompression is applied is represented by τm'. As shown in FIG. 8B, as the foregoing precompression is applied, a compressive load in the Y direction acts between the atomic row A and the atomic row B. Therefore, a slide surface distance a' when the precompression is applied is shorter than the slide surface distance a when the precompression is not applied. Thus, a relational expression of a'<a is established, and, based on the expression (1), a relational expression of τm'>τm is established. Therefore, in the state where the precompression is applied, when shearing stress acting on the large end portion 13 exceeds the critical shearing stress τm' that is larger than the critical shearing stress τm, the large end portion 13 is fractured. As described above, as the critical shearing stress increases, bonding between the atomic row A and the atomic row B is easily cut, thereby restraining slip deformation at the time of the fracture. Thus, the plastic deformation is restrained at the time of fracture, and brittle fracture is thus ensured.

For example, the precompression may be applied to the large end portion 13 as the inner peripheral surface of the large end hole 14 on the bolt hole 15 side is pressed in the +X direction, and the inner peripheral surface of the large end hole 14 on the bolt hole 16 side is pressed in the −X direction. However, in this case, points of action of the precompression are located on the inner peripheral surface of the large end hole 14 on an inner side with respect to the bolt holes 15, 16. Therefore, even when the precompression is applied, the bolt holes 15, 16 are deformed so as to contract. Hence, brittle fracture may not be ensured because a load does not sufficiently act on a portion on an outer side of the bolt hole 15 in the +X direction and on a portion on an outer side of the bolt hole 16 in the −X direction. On the contrary, according to the embodiment, the inner peripheral surfaces of the bolt holes 15, 16 become points of action of the precompression, and a load is able to act sufficiently on the portion on the outer side of the bolt hole 15 in the +X direction, and on the portion on the outer side of the bolt hole 16 in the −X direction. Therefore, brittle fracture is ensured.

The precompression applied to the large end portion 13 is adjusted in advance so that compressive stress acting on the large end portion 13 due to the precompression does not exceed an elastic limit of the large end portion 13. Therefore, plastic deformation of the large end portion 13 caused by the precompression applied to the large end portion 13 is restrained.

Also, the insertion members 145, 146, 155, 156 apply the foregoing precompression to the large end portion 13 of the base material 1. At the same time, the insertion members 145, 146, 155, 156 restrict moving directions of the rod portion 20 and the cap portion 30 at the time of fracture of the large end portion 13, while restraining displacement of the base material 1. As described above, functions are aggregated in the insertion members 145, 146, 155, 156, thereby restraining an increase in the number of parts, and an increase in manufacturing cost for the fracture split machine.

Further, brittle fracture may be ensured by changing a material of the base material 1 to one that brittle fracture happens easily. However, in this case, material cost may be increased. Moreover, when a connecting rod is manufactured by using such a material, its durability may be affected. Therefore, as described in the embodiment, since the large end portion 13 of the base material 1 is fractured while the precompression is applied, it is possible to ensure brittle fracture while restraining material cost and also ensuring durability.

The insertion members 145, 146, 155, 156 have a circular sectional shape. However, their sectional shapes are not limited to the circular shape. The sectional shapes may be fan shapes having arc portions that go along the inner peripheral surfaces of the bolt hole 15 or 16, respectively, when the precompression is applied to the large end portion 13. Also, the sectional shapes may be a prism shape.

In the embodiment, the insertion members 145, 155 inserted from both sides of the bolt hole 15, respectively, and the insertion members 146, 156 inserted from both sides of the bolt hole 16, respectively, apply the precompression to the large end portion 13 of the base material 1. However, the disclosure is not limited to this. For example, the drive mechanism 150 may not be provided, and only the insertion members 145, 146 may apply the precompression to the large end portion 13. Also, the drive mechanism 140 may not be provided, and only the insertion members 155, 156 may apply the precompression to the large end portion 13. In this case, it is preferred that the precompression is applied to the large end portion 13 in a state where the insertion members are inserted into the bolt holes 15, 16, respectively, as deeply as possible. This is because, the precompression is distributed evenly in the axis directions of the bolt holes 15, 16, in other words, the Y direction, thereby restraining an uneven compressive load in the Y direction caused by the precompression.

Figure 9A:
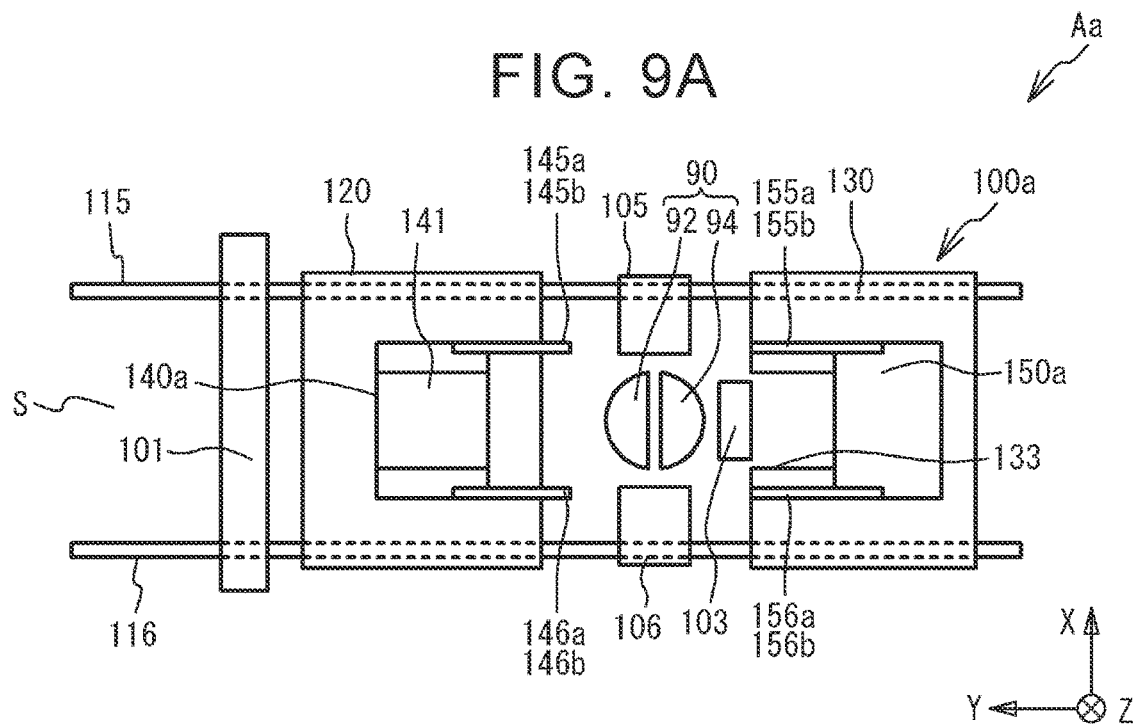
FIG. 9A is a view describing a fracture split machine according to a modification.
Figure 9B:
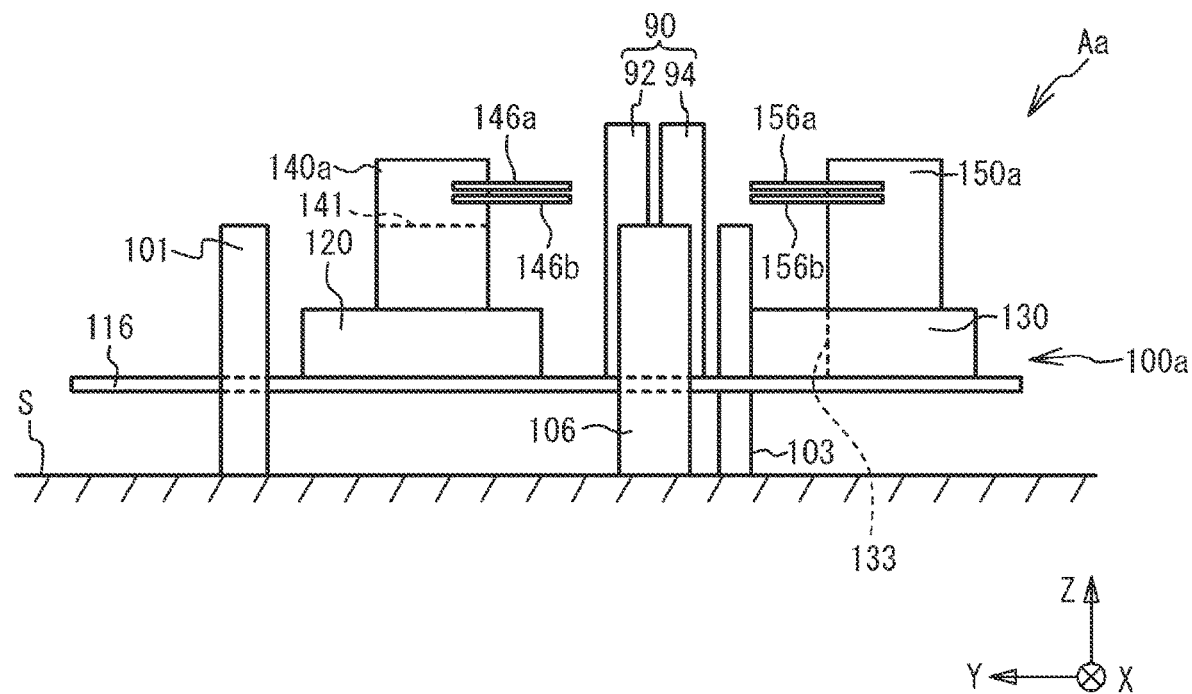
FIG. 9B is a view describing the fracture split machine according to the modification.

Next, a modification is described. FIG. 9A and FIG. 9B are views describing a fracture split machine Aa according to the modification. FIG. 9A and FIG. 9B correspond to FIG. 3A and FIG. 3B, respectively. In the modification, the same and similar constituents to those of the embodiment are represented by the same or similar reference numerals, thus omitting duplicated description.

A drive mechanism 140a of a precompression application mechanism 100a of the fracture split machine Aa includes insertion members 145a, 145b, 146a, 146b. The insertion members 145a, 145b overlap each other in the Z direction, and the insertion members 146a, 146b also overlap each other in the Z direction. The drive mechanism 140a incorporates an actuator, and the actuator holds the insertion members 145a, 145b so that the insertion members 145a, 145b are able to move closer to or be separated from each other at given intervals in the Z direction. Similarly, the actuator holds the insertion members 146a, 146b so that the insertion members 146a, 146b are able to move closer to or be separated from each other at given intervals in the Z direction. Similarly, a drive mechanism 150a of the precompression application mechanism 100a includes insertion members 155a, 155b, 156a, 156b. The insertion members 155a, 155b overlap each other in the Z direction, and the insertion members 156a, 156b also overlap each other in the Z direction. The drive mechanism 150a incorporates an actuator, and the actuator holds the insertion members 155a, 155b so that the insertion members 155a, 155b are able to move closer to or be separated from each other in the Z direction. Similarly, the actuator holds the insertion members 156a, 156b so that the insertion members 156a, 156b are able to move closer to or be separated from each other at given intervals in the Z direction.

Figure 10:
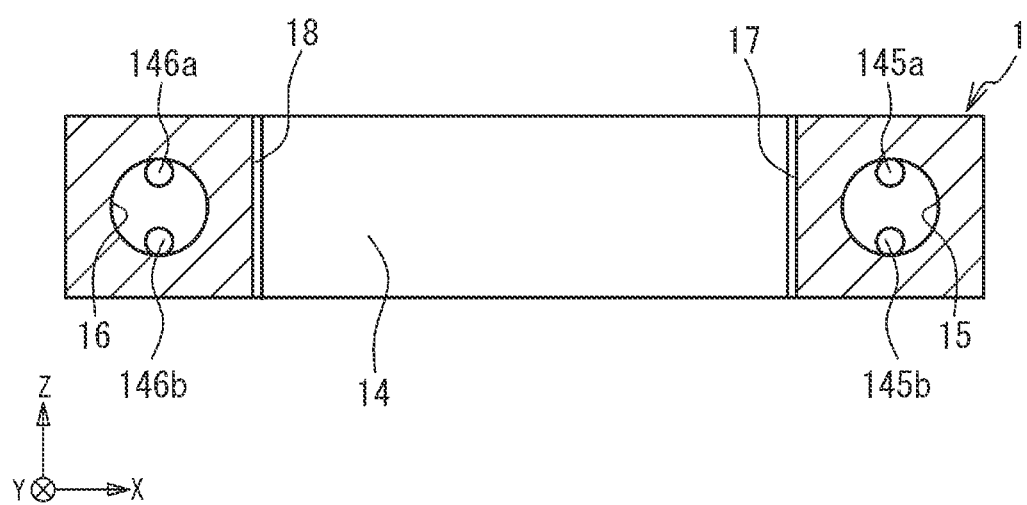
FIG. 10 is a sectional view of the base material in a state where precompression is applied by the fracture split machine according to the modification.

FIG. 10 is a sectional view of the base material 1 in a state where precompression is applied by the fracture split machine Aa according to the modification. FIG. 10 shows a section perpendicular to the Y direction. In FIG. 10, the mandrel 90 is not shown. The insertion members 145a, 145b are inserted in the bolt hole 15, and the insertion members 146a, 146b are inserted in the bolt hole 16. Although not shown in FIG. 10, the insertion members 155a, 155b are inserted in the bolt hole 15, and the insertion members 156a, 156b are inserted in the bolt hole 16. In this state, the insertion members 145a, 145b press an inner surface of the bolt hole 15 so that the insertion members 145a, 145b are separated from each other in the Z direction. Similarly, the insertion members 155a, 155b press the inner surface of the bolt hole 15 so that the insertion members 155a, 155b are separated from each other in the Z direction. Further, the insertion members 146a, 146b press an inner surface of the bolt hole 16 so that the insertion members 146a, 146b are separated from each other in the Z direction. Similarly, the insertion members 156a, 156b press the inner surface of the bolt hole 16 so that the insertion members 156a, 156b are separated from each other in the Z direction. This way, precompression is applied to the large end portion 13 of the base material 1 in the Z direction that is the axis direction of the large end hole 14. Even when a tensile load is applied as the precompression in the Z direction instead of the X direction, a compressive load acts on the large end portion 13 in the Y direction, thereby ensuring brittle fracture. Thus, in the modification, unlike the embodiment described earlier, a tensile load is applied to the large end portion 13 as the precompression in the Z direction that is a cross section intersecting with the longitudinal direction of the base material 1.

In the modification, two insertion members that overlap each other in the Z direction are inserted into each of the bolt holes 15, 16. Therefore, the modification is suitable for a case where the bolt holes 15, 16 have large inner diameters, in other words, the base material 1 is large.

In the modification, the drive mechanism 150a may not be provided, and only the insertion members 145a, 145b, 146a, 146b may apply the precompression to the large end portion 13. Further, the drive mechanism 140a may not be provided, and only the insertion members 155a, 155b, 156a, 156b may apply the precompression to the large end portion 13. In this case, it is also preferred that the precompression is applied to the large end portion 13 in a state where the insertion members are inserted to the bolt holes 15, 16, respectively, as deeply as possible.

In the embodiment and the modification described above, it is preferred that a direction of the tensile load that is applied as the precompression is perpendicular to the Y direction that is a direction of a tensile load acting on the large end portion 13 at the time of fracture. However, the disclosure is not limited to this. In the embodiment, it is only necessary that the direction of a tensile load applied as the precompression intersect with the Y direction so that the tensile load applied as the precompression contains a larger component in the X direction than a component in the Y direction. In the case of the modification, it is only necessary that the direction of a tensile load applied as the precompression intersect with the Y direction so that the tensile load applied as the precompression contains a larger component in the Z direction than a component in the Y direction. This is because, in either case, a compressive load acts on the large end portion 13 in the Y direction due to the precompression.

The embodiment of the disclosure has been described in detail. However, the disclosure is not limited to the specific embodiment, and various deformation and changes can be made without departing from the gist of the disclosure described in the claims.

What is claimed is:

1. A manufacturing method for a connecting rod, comprising:
    applying a first tensile load to an end portion of the connecting rod in a cross direction that intersects with a longitudinal direction, wherein the end portion is a longitudinal end portion of the connecting rod having a through-hole, and the first tensile load causes a precompression of the end portion; and
    fracture splitting the end portion into a rod portion of the connecting rod and a cap portion of the connecting rod by applying a second tensile load to the end portion in the longitudinal direction in a state where the precompression is applied to the end portion, wherein:
    the end portion includes first and second bolt holes that are separated from each other with the through-hole interposed between the first and second bolt holes and extend in the longitudinal direction; and
    when the precompression is applied to the end portion, first and second members and third and fourth members are used to apply the first tensile load to the end portion in the cross direction, the first and second members being inserted into the first and second bolt holes, respectively, from a first side, and the third and fourth members being inserted into the first and second bolt holes, respectively, from a second side.

2. The manufacturing method according to claim 1, wherein the cross direction is perpendicular to an axis direction of the through-hole.

3. The manufacturing method according to claim 1, wherein the cross direction is along an axis direction of the through-hole.

4. The manufacturing method according to claim 1, wherein the first and second members are bar-shaped members extending in axis directions of the first and second bolt holes, respectively.

* * * * *